United States Patent [19]

Pawlikowski et al.

[11] 4,020,494

[45] Apr. 26, 1977

[54] CRT SCREEN EXPOSURE DEVICE HAVING IMPROVED OPTICAL ALIGNMENT

[75] Inventors: Stanley L. Pawlikowski, Seneca Falls; Carl W. Penird, Waterloo, both of N.Y.

[73] Assignee: GTE Sylvania Incorporated, Stamford, Conn.

[22] Filed: Mar. 18, 1976

[21] Appl. No.: 668,063

[52] U.S. Cl. .................................................. 354/1

[51] Int. Cl.² ........................................ G03B 41/00

[58] Field of Search ............... 354/1; 96/36.1, 27 E; 313/274, 278

[56] References Cited

UNITED STATES PATENTS

| | | | |
|---|---|---|---|
| 3,476,025 | 11/1969 | Herzfeld et al. | 354/1 |
| 3,482,495 | 12/1969 | Jameikis | 354/1 |
| 3,667,947 | 6/1972 | McKee | 96/36.1 |

*Primary Examiner*—Edna M. O'Connor

*Attorney, Agent, or Firm*—Norman J. O'Malley; Frederick H. Rinn; Robert T. Orner

[57] ABSTRACT

An improvement is provided in a cathode ray tube screen exposure device to achieve optimum optical alignment of related components constituting the exposure optical system. In relationship with a discretely positioned light output area, separate means are provided to achieve fine adjustable positionings of both the source of radiant energy and the associated reflective means in both $x$ and $y$ related directions in planes normal to the optical axis, and in the $z$ related direction in planes parallel to a central axis. Each of the respective optical alignment adjustments is individually effected by linkages to separate exteriorly located control means. Retentive means are incorporated in the respective linkages to insure accurate maintenance of the cooperative adjustments.

10 Claims, 3 Drawing Figures

CRT SCREEN EXPOSURE DEVICE HAVING IMPROVED OPTICAL ALIGNMENT

BACKGROUND OF THE INVENTION

This invention relates to a cathode ray tube screen exposure device and more particularly to means for achieving fine alignment adjustment of related components in the optical system employed in the screen exposure device.

A cathode ray tube of the type utilized in image reproduction, such as in color television, conventionally employs one or more electron guns to provide the electron beam or beams utilized to effect the display. In operation, the modulated electron beams are predeterminately deflected across the screen of the tube to provide electron impingement upon selected color-emitting phosphor configurations comprising the patterned screen disposed on the tube viewing panel, whereat the transmitted color display is reproduced. It is usual practice to interpose a multi-apertured grid, mask, or other type of negative structure between the electron gun assembly and the screen structure of the tube to provide either masking of the screen, or deflection or focusing of the electron beam or beams thereat.

In the conventional color cathode ray tube, the electron sensitive screen is generally comprised of a repetitive pattern of multitudinous dot, bar, or stripe formations of various phosphors capable of emitting, for example, green, red and blue color luminescence upon electron beam impingement. In some tubes, the pattern of phosphors is disposed to overlay the multitudinous window areas of an opaque screen matrix formed on the viewing portion of the panel. The configurations of the matrix windows and the associated color-phosphor patterns constituting this type of screen construction are formed in accordance with the number of electron guns utilized and with the discrete aperture configurations and operative characteristics of the grid or mask employed in the respective tube.

Since innumerable color phosphor groups are required to produce a high resolution display of desired colorpurity, the process employed in forming both the windowed matrix and the phosphor screen must be one that is capable of accurately forming a multitude of similar discrete configurations in the screen structure. In a preferred method for fabricating the color screen structure, a photo-printing technique is utilized wherein the tube viewing panel, having an interior coating of photosensitive resist composition disposed thereon, is positioned upon an exposure device and suitably photo-exposed through the related negative or multi-apertured mask by radiant energy emanating from a specifically oriented light means within the device. Subsequent development of the selectively exposed panel produces either a first window pattern of the matrix, or in proper sequence, the first color phosphor pattern of the subsequently formed screen. Such photo exposure is sequentially repeated in the proper steps of the procedure to form the remaining windows in the matrix and to later effect deposition of the respective color-emitting phosphor materials associated therewith to complete the fabrication of the patterned screen construction. In separately producing the matrix and the related patterned array of phosphor elements, the light means providing the radiant energy utilized in photo-deposition is appropriately offset from a central axis during the exposure operation for each of the respective color phosphor patterns and definitive window areas constituting the screen.

The screen forming device employed in exposing the sensitized screening material for color cathode ray tubes of the above described type, is conventionally known in the art as a "lighthouse." This structure contains an optical system comprising a light permeable refractive medium or corrective lens and a conjunctive light means relatively positioned to provide the required amount of radiant or actinic energy for proper exposure activation of the light-sensitive coating disposed on the viewing area of the panel. For example, to produce the desired pattern of both the matrix and the phosphor elements of the screen structure, the components of the optical system are oriented or aligned relative to an optical axis in a manner to radiate light over the whole of the multi-apertured mask. Thus, the actinic energy traverses the apertures therein to expose discrete areas, be they matrix windows or the subsequently disposed phosphor dots or stripes, on the respectively sensitized screen material therebehind to thereby produce a patterned array of defined configurations having exactness in accordance with the registration requirements of subsequent electron beam impingement in the finished tube. Several factors determine the optimum setup of the exposure optical system, whereupon the screen-lens-light-means distance relationships are altered depending upon variables such as: the size and shape of the screen, the sensitivity of the photoresist material, and the size and shape of the mask apertures.

It has been found that the relationship of the several components comprising the optical system of the exposure device require precise alignment which is often difficult to achieve because of mechanical tolerances and inherent inaccuracies. The light distribution evidenced from a given alignment setup of the optical components is not always uniform at the screen area of the panel. In attempting to achieve the desired uniformity of exposure radiation across the screen area, a number of time-consuming steup modifications are required. The non-uniformity of light distribution may be due to misalignment of the light output area such as the collector, the light means, or the reflector; and optimum results may necessitate a slight shift of one or more elements from axial alignment per se. The imbalance in light distrubution is particularly evidenced in circumferential variations of radiant energy relative to the optical axis, the correction of which often requires a plurality of painstaking adjustments. Consequently, the optimized functioning of the optical system to provide uniform light output, is often not attained in screen exposure, as it is difficult to effect minute adjustments to the system during operation of the device.

OBJECTS AND SUMMARY OF THE INVENTION

It is an object of the invention to reduce and obviate the aforementioned disadvantages evidenced in the prior art. A further object is the provision of an improved cathode ray tube screen exposure device having discrete means for achieving fine adjustable positional movement of at least two prime components in the optical system. Another object is the provision of a screen exposure device evidencing facile adjustments of the light means and associated reflective means to achieve optimum light output from the optical system during operation.

These and other objects and advantages are achieved in one aspect of the invention wherein there is provided an improvement for achieving optical alignment of the source of radiant energy and the reflective means associated therewith relative to the light output area of the optical system. Mechanical means are provided for consummating fine adjustable positioning movement of the source of radiant energy in $x$ and $y$ directions in a plane substantially normal to the optical axis. Additionally, means is provided for achieving fine positional movement of the source of radiant energy in a $z$ direction in a plane substantially parallel to the central axis of the device. Conjunctively therewith, other means are provided for effecting $x$, $y$, and $z$ movements of the relfective means associated with the source of radiant energy to optimize the system for producing the maximum operational output.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

It is to be understood that the improved alignment means of the invention are equally applicable to utilization in screen exposure devices for fabricating tri-dot, slotted, or lined color CRT screen pattern arrays and associated windowed matrices. In this instance, the exposure of a tri-dot screen is delineated.

Figure 1:
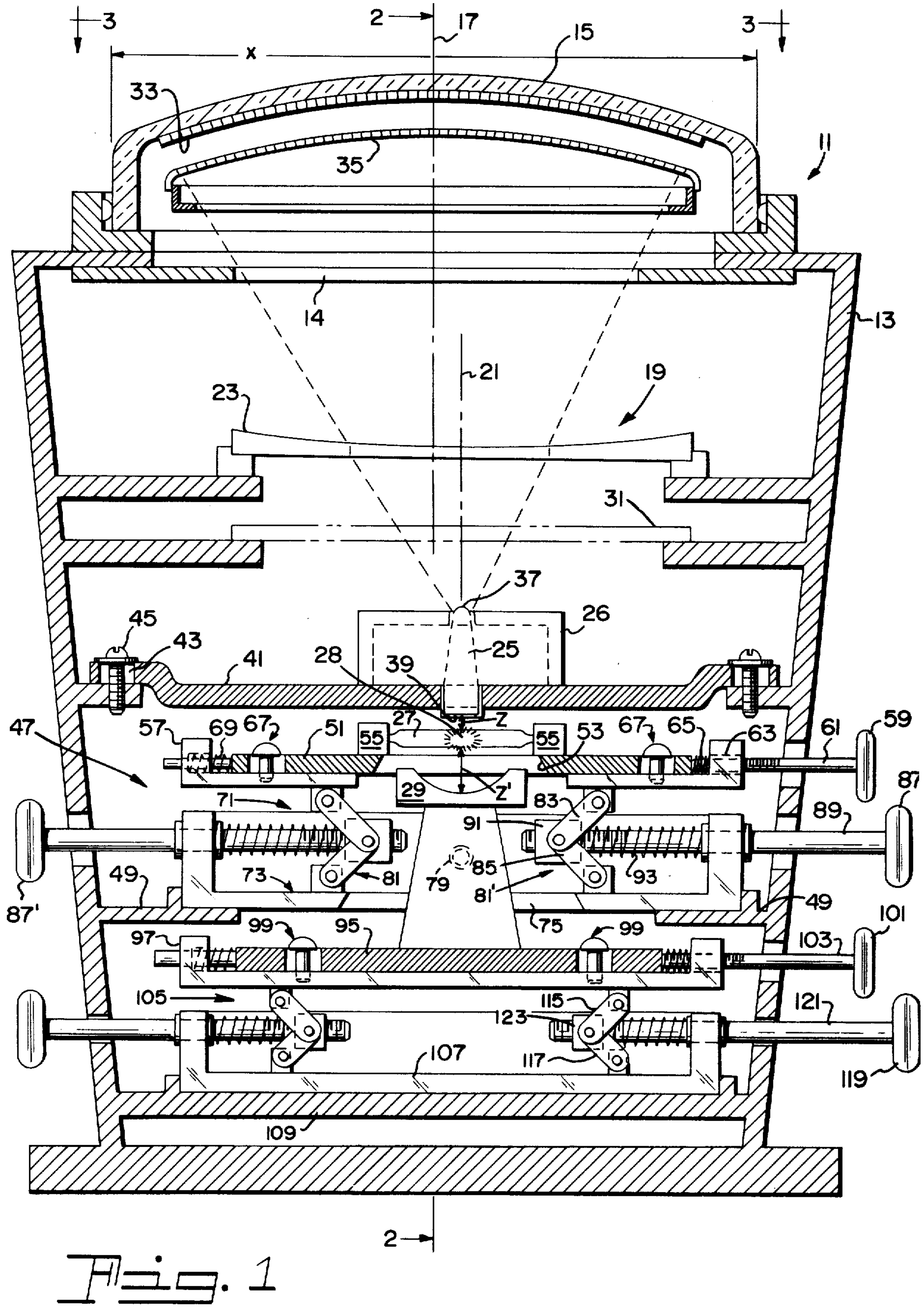
FIG. 1 is a cross sectional view of a cathode ray tube screen exposure device wherein the improved means of the invention are incorporated.
Figure 2:
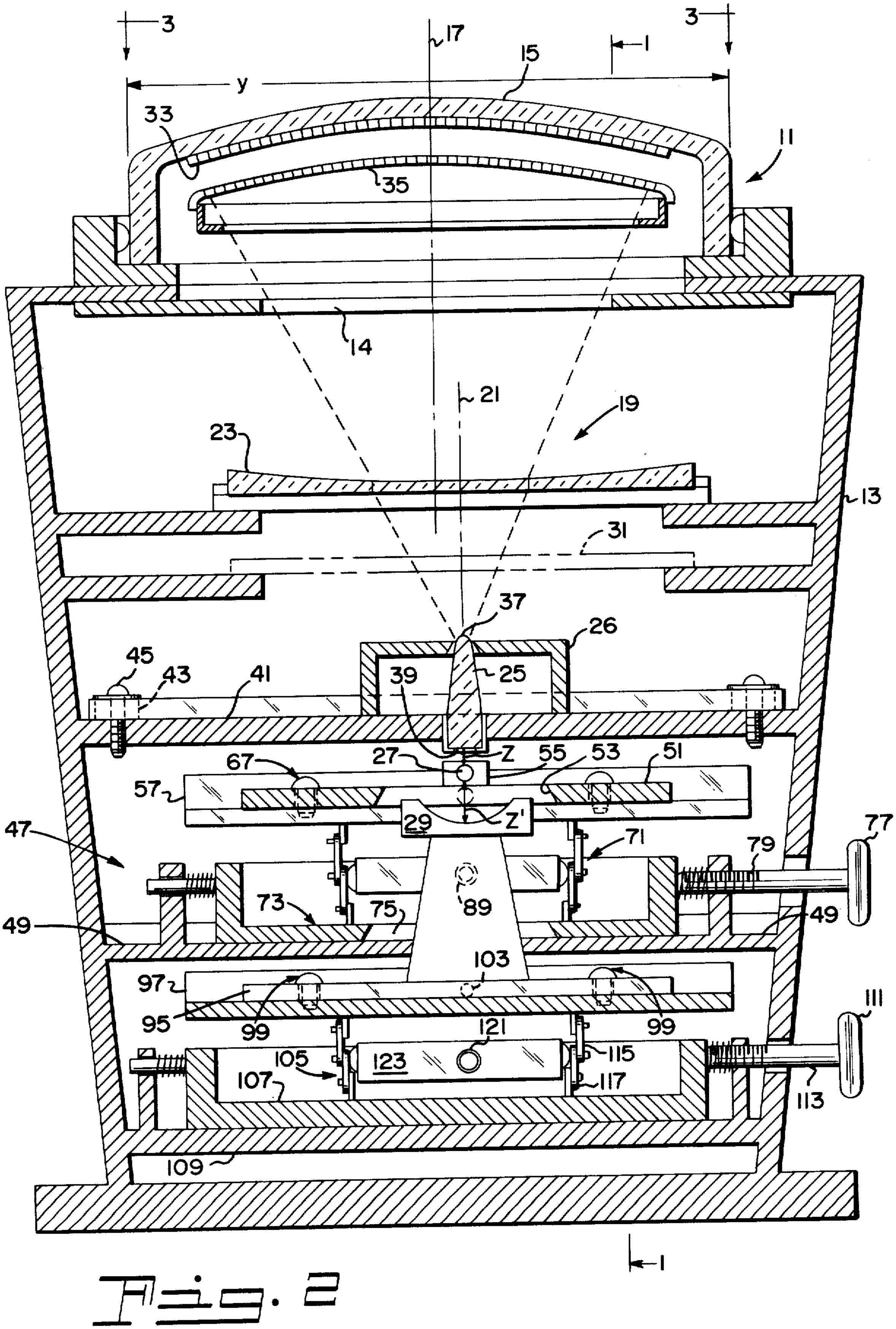
FIG. 2 is a sectional view of the same exposure device taken along the line 2—2 of FIG. 1.

With reference to the drawings, there is shown in FIGS. 1 and 2 a cathode ray tube screen exposure device or lighthouse 11 of the basic type employed in forming patterned color CRT screen structures. The device which is walled by an encompassing enclosure 13, having an opening 14 therein shaped to accommodate exposure of a cathode ray tube face or display panel 15, has a central axis 17 therethrough and employs an internally positioned optical system 19 oriented on an optical axis 21 which may be offset from the central axis 17. As shown, the exemplary optical system includes a refractive medium or lens 23, a light collector rod 25, and a light means providing a source of radiant energy 27, having a reflective element 29 associated therewith. If desired, the system may include a light attenuating element or graded filter means 31 to selectively modify the exposure radiation. In some systems, a configuration of a thin coating gradient of light attenuating material is discretely disposed on a surface of the refractive medium. Also, in certain optical systems the light collector rod is omitted and a defined aperture substituted therefor. In this disclosure, the terminology "light output area " is intended to delineate sufficient breadth to include either a light collector rod or a defined optical aperture from which light is beamed.

Positioned over the opening 14 in the exposure device is a cathode ray tube display panel 15 having a photoresist composition disposed on the inner surface thereof to form a light-sensitive screen 33. The shape or perimetric contour of the panel may be round, oval, rectangular, or any combination or variation thereof. Whatever the perimetric contour the panel may be, the dimensional geometry of the opening 14 in the device is made commensurate therewith. For purposes of illustration, a substantially rectangular panel is shown and described herein. Oriented within the panel 15, and spaced from the screen 33, is a negative or multi-apertured mask 35 through which exposure radiation is beamed to form a discretely patterned array of apertured shapings on the light-sensitive screen therebeneath.

In greater detail, the figures illustrate the various componental parts contained within the exemplary exposure optical system. The light output area, is, in this instance, a light collector 25 formed of a diffusely ground quartz rod having a tip 37 providing a sole light-exit-area of a shape in keeping with the screen forming requirements from which exposure radiation is beamed through the refractive medium toward the panel 15. The light rod collects radiant energy emitted from the light means, such as for example, a small cylindrical mercury vapor lamp 27 positioned proximal to the input or base surface 39 of the rod. This lamp provides a luminescent arc 28 which is the true source of radiant energy in the device. A reflective element 29, oriented adjacent to the lamp, has a substantially concave mirror surface thereon which collects and reflects the radiant energy to the base of the collector rod thereby effecting utilization of a major amount of the arc light output 28 emanating from the lamp 27.

This invention relates to improved means for optimizing the dimensional relationships between the light collector rod 25, the arc source of radiant energy 28, and the reflector means 29. The improved optical alignment thus achieved markedly reduces the imbalance of light distribution reaching the screen and thereby promotes improved exposure of the desired screen pattern.

Figure 3:
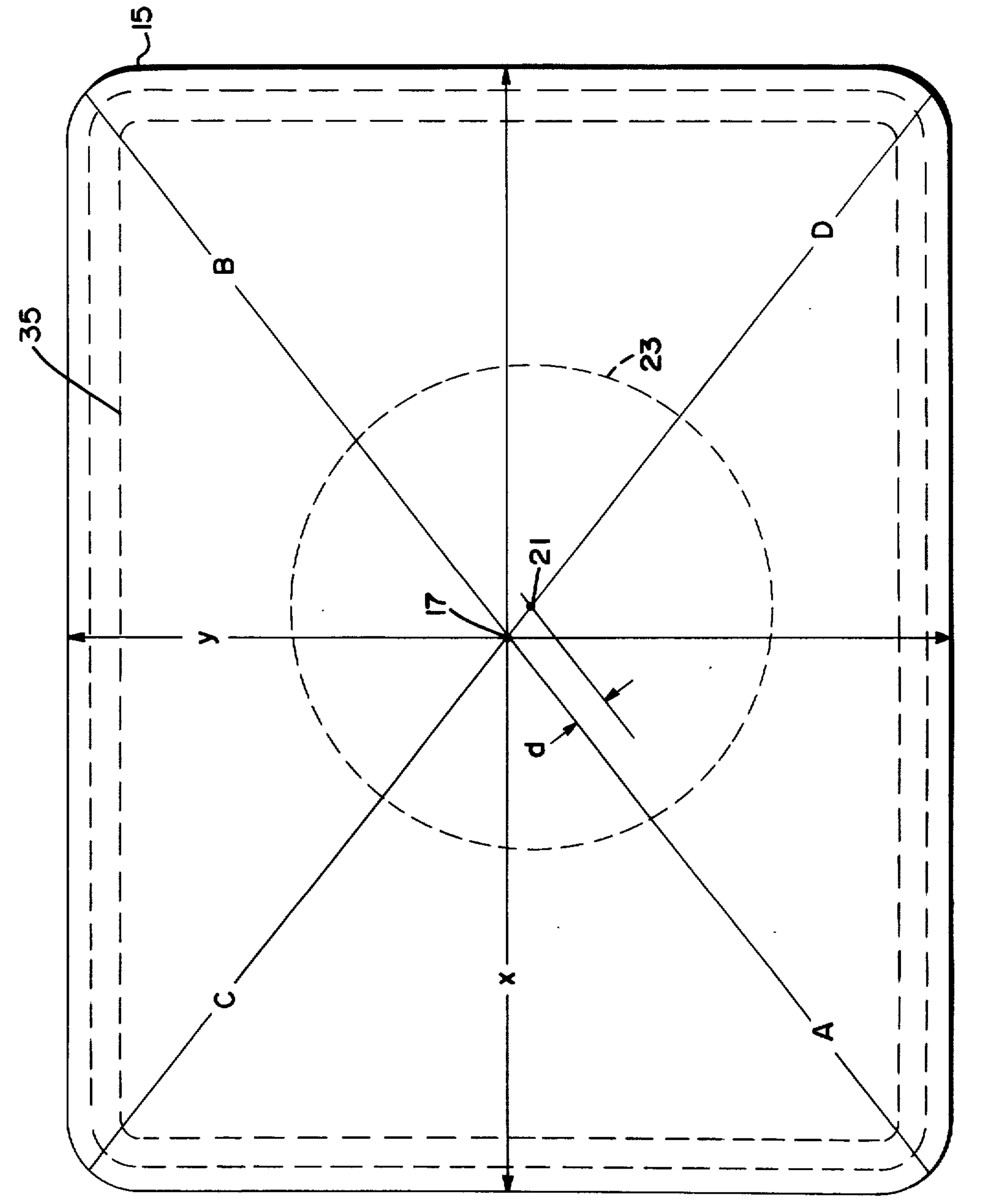
FIG. 3 is a plan view of the panel taken along the lines 3—3 of FIGS. 1 and 2.

For details of the invention, reference is directed to the drawings. FIG. 3 presents a plan view looking into the panel 15 positioned on the exposure device 11, such being referenced by the lines 3—3 indicated in FIGS. 1 and 2. As shown in FIG. 3, the $x$ axis of the panel corresponds substantially with the 3–9 o'clock major dimension thereacross and the $y$ axis with substantially the 12–6 o'clock minor dimension thereof. Diagonals AB and CD across the corners of the panels define the corner regions A, B, C and D whereat uniform exposure radiation is desired. The off-set distance d of the optical axis 21 from the central axis 17 is accentuated for purposes of illustration. Actually, the off-set dimension is in the order of 5.6 mm. In the sectional elevation of the exposure device 11, as shown in FIG. 1, the panel 15 and mask 35 structures are sectioned in a plane relative to the $x$ axis thereof corresponding substantially to a cleavage proximal to the 3–9 o'clock sectors of the panel. In FIG. 2, the cross-sectional elevation delineates the panel and mask structures as being sectioned along the $y$ axis which corresponds substantially to the 12–6 o'clock sectors of the viewing panel. Thus, $x$ and $y$ traverse directions are delineated in a substantially common plane relative to the face of the panel. By means of the invention, both the arc light source and reflector components of the system are individually and facily adjustable in both abscissa and ordinate movements in their respective planes on or about the optical axis 21, relative to the $x$ and $y$ co-ordinates evidenced in the figures to promote optimum optical operation.

In considering the individual optical components of the system, the refractive means 23 and the optional shader or graded light attenuation means 31 are indicated as conventionally oriented components in the exposure device 11. The light output positioning means 41 accommodating the light collector 25 and the accompanying box-like enclosure 26, is shown to be laterally adjustable for optimized $x$–$y$ related movements, in a plane substantially parallel with that of the panel, by a plurality of affixal means, such as large-aperture 43 and tie-down 45 bolt arrangements. The exemplary radiant energy lamp positioning structure 47 is slidingly located on two opposed stationary shelves 49 integral to the exposure device 11. Mechanical means for achieving fine adjustable positional movement of the arc 28, emanating from the lamp 27, in an $x$ related direction in a plane normal to the optical axis, and substantially parallel with that of the panel 15, is comprised of a lamp-mounting-plate-cradle 57, and is slidably movable thereon in a planar direction substantially coincident with the aforenoted $x$ axis. Such movement is effected, for instance, by a knob-actuated threaded shaft 59–61 which traverses a portion of the cradle frame through a threaded bore 63. Thence, the end of the shaft 65 abuts the plate 51 and consummates desired movement thereof in accordance with the associated guide means 67, such as sliding pin-in-slot arrangements. A resilient helix or compressive element 69 coacts with each end of the slidable mounting plate 51 to provide retentive means for maintaining respective adjustment of the lamp in the $x$ related direction.

The lamp-mounting-cradle 57 is spatially supported by vertical adjustment means 71 upon a light-support-frame 73, having a defined substantially central opening 75 therein. As exemplarily shown in FIG. 2, this light-support-frame 73 rests upon shelf means 49, and is slidably adjustable thereon in a $y$ related direction by a knob 77 and a rotatable threaded shaft 79 abutting frame 73. In this manner both $x$ and $y$ related directional adjustments in a common $X$–$y$ plane, parallel to that of the panel, are readily achieveable to optimize positioning of the arc 28 relative to the input surface of the light collector rod 25. The aforementioned vertical adjustment means 71 supporting the light-mounting cradle 57, may be, for example, a plurality of coacting lever means 81, 81' manifesting expansion and contraction thereby effecting vertical adjustment of the lamp 27 in the $z$ direction in a plane substantially parallel to the central axis 17. As shown, for example, pairs of cooperating levers, such as 83 and 85, are provided to facilitate independent movement of each end of the lamp to more accurately position the arc 28; such movement being effected by a rotatable knob 87 or 87' and a laterally-confined threaded shaft arrangement 89 mating with a threaded movable pivot-block 91. A helix compression element or spring 93 is associated with each shaft to provide retentive means for maintaining the respective adjusted $z$ or vertical positionings.

In a similar manner, the lamp reflective means 29 has associated therewith mechanical means for achieving fine adjustable positional movement in an $x'$ related direction in a plane normal to the optical axis and substantially parallel with that of the panel. For example, the reflective means 29 is mounted on the light-reflector plate 95, which in turn rests in a light-reflector cradle 97. The mounting plate 95 is slidably adjustable on the cradle, within the confines of the guide means 99, in an $x'$ related direction by a knob 101 and threaded shaft 103 arrangement of the type previously described. The reflector mounting cradle is supported by a vertical adjustment means 105 oriented upon the reflector-support-frame 107, which is in turn slidable upon a stationary shelf 109 integral to the device 11. The reflector-support-frame 107 is slidable in a $y'$ related direction by exemplary knob 111 and threaded shaft means 113 as shown in FIG. 2, being of the type previously described. Thus, $x'$ and $y'$ related movements of the reflective means are effected by cooperating mechanical means in a substantially common $x' - y'$ plane, which is spatially removed from and substantially parallel to the $x - y$ plane wherein the $x$ and $y$ related movements of the lamp 27 are effected. The aforenoted vertical adjustment means 105 supporting the reflector mounting cradle 97 upon the reflector-support-frame 107 are, for example, a plurality of cooperating levers 115 and 117. These are controlled by a knob 119 and threaded shaft 121 arrangement, in conjunction with threaded pivot-block 123, to provide fine adjustable positional movement of the reflector in a $z'$ direction in a plane substantially parallel to the central axis 17.

Thus, there are provided means for achieving $x$, $y$, and $z$ individual adjustable movements for both the radiant energy source 28 and the reflective means 29. Each of the respective adjustments is individually effected by linkages to separate control means located exteriorly of the enclosure of the exposure device whereby both the arc source and the associated reflector means are accurately positioned in an optimally optical relationship to the light output area or light collector rod 25 to achieve uniformity of exposure radiation sequentially progressive in a circumferential manner outward from the axis of the panel. Each of the adjustable means incorporates retentive means for maintaining the respective adjusted positionings to insure optimum alignment of the related optical components in the system during operation.

While there has been shown and described what are at present considered the preferred embodiments of the invention, it will be obvious to those skilled in the art that various changes and modifications may be made therein without departing from the scope of the invention as defined by the appended claims.

What is claimed is:

1. An improvement in a cathode ray tube screen exposure device having an encompassing enclosure with a central axis therethrough and employing an internally positioned optical system oriented on an optical system axis offset from said central axis, said optical system including a light output area, related light means effecting a source of radiant energy and an associated spatially positioned reflective means, said system providing discrete exposure of a sensitized screen coating disposed on the interior surface of a CRT display panel positioned over an opening in said device, said panel having an $x - y$ plane delineated by $x$ and $y$ axes substantially coincident with the respective major and minor dimensions of the display area thereof and an interiorly oriented multi-apertured grid negative spacedly related to the screen portion thereof, said improvement being optical alignment means comprising:

mechanical means for achieving fine adjustable positional movement of said source of radiant energy relative to said light output area in an $x$ related direction in a plane substantially normal to said optical axis and substantially parallel with the $x-y$ plane of said panel; and mechanical means for achieving fine adjustable positional movement of said source of radiant energy relative to said light output area in a $y$ related direction in a plane substantially normal to said optical axis and substantially parallel with the $x-y$ plane of said panel; each of said respective adjustable movements being effected by individual linkage means to separate control means located exteriorly of said enclosure whereby said radiant energy source is optionally optically aligned relative to said light output area.

2. The improvement in a cathode ray tube screen exposure device according to claim 1 wherein there is incorporated associated mechanical means for achieving fine adjustable positional movement of said source of radiant energy relative to said light output area in a $z$ related direction in a plane substantially parallel to said central axis, said $z$ movement means having linkage to separate control means exterior of said enclosure to provide facile adjustment.

3. The improvement in a cathode ray tube screen exposure device according to claim 2 wherein said light output area is the emitting terminal area of a light collector rod spatially associated with said radiant energy source, and wherein said $x$, $y$ and $z$ related movements of said radiant energy source are effected relative to the input surface of said light collector rod.

4. The improvement in a cathode ray tube screen exposure device according to claim 2 wherein each of said respective mechanical means effecting the define $x$, $y$ and $z$ related movements of said source of radiant energy incorporates retentive means for maintaining the respective adjusted positionings to insure optimum alignment of the related optical components.

5. The improvement in a cathode ray tube screen exposure device according to claim 1 wherein said $x$ and $y$ related movements of said radiant energy source are effected by mechanical means in a substantially common $x-y$ plane.

6. The improvement in a cathode ray tube screen exposure device according to claim 1 wherein said reflective means has associated therewith mechanical means for achieving fine adjustable positional movement in an $x$ related direction in a plane normal to said optical axis; and separate mechanical means for achieving fine adjustable positional movement in a $y$ related direction in a plane normal to said optical axis, said adjustments effecting optimal optical alignment of said reflective means in relationship to said source of radiant energy.

7. The improvement in a cathode ray tube screen exposure device according to claim 6 wherein said $x'$ and $y'$ related movements of said reflective means are effected by mechanical means in a substantially common $x'-y'$ plane spatially removed from and substantially parallel to the $x$-$y$ plane of said $x$ and $y$ related movements of said radiant energy source.

8. The improvement in a cathode ray tube screen exposure device according to claim 6 wherein said reflective means has associated therewith mechanical means for achieving fine adjustable positional movement thereof in a $z'$ related direction relative to said source of radiant energy in a plane substantially parallel to said central axis.

9. The improvement in a cathode ray tube screen exposure device according to claim 8 wherein each of said $x'$, $y'$, and $z'$ adjustable movements of said reflective means are individually effected by linkages to separate control means located exteriorly of said enclosure whereby said reflective means is accurately aligned in an optimally optical relationship to said source of radiant energy.

10. The improvement in a cathode ray tube screen exposure device according to claim 9 wherein each of said respective mechanical means effecting the defined $x'$, $y'$ and $z'$ related movements of said reflective means incorporates retentive means for maintaining the respective adjusted positionings to insure optimum alignment of the related optical components.

* * * * *